April 28, 1970   W. J. LANG   3,509,333

LIGHTED DISPLAY UNIT

Filed Nov. 13, 1967

INVENTOR.
WILLIAM J. LANG
BY
ATTORNEY

United States Patent Office 3,509,333
Patented Apr. 28, 1970

3,509,333
LIGHTED DISPLAY UNIT
William J. Lang, Orange, Calif., assignor to Symbolic Displays, Inc., Orange, Calif., a corporation of California
Filed Nov. 13, 1967, Ser. No. 682,285
Int. Cl. F21l 15/00
U.S. Cl. 240—11.2                                    8 Claims

ABSTRACT OF THE DISCLOSURE

The generally cubical light modules contain incandescent bulbs whose light is emitted from one face of the cube. The opposite face of the cube is formed with electrical contact means which are placed upon the circuit contacts of a circuit board which serves as the base of the unit. A bezel overlies each of the modules. The bezels are made of transparent or translucent material coated to render them opaque except in areas defining the required indicia. The unit also includes a frame which is secured to the base and which encompasses the modules and bezels and holds them clamped against one another and the base in proper spaced relation and in contact with the electrical contacts of the base. The frame is formed in two parts, one of which nests within the other and telescopes within that other in the direction toward and away from the base. This frame arrangement precludes light leaks from the sides of the unit, overcomes differences in dimension of components within the limits of normal manufacturing tolerance, and permits resilient engagement of the module and base electrical contact means.

---

This invention relates to improvements in lighted display units and it relates particularly to displays of a kind which are included in the face of instruments, instrument panels and light plates which require annunciator capabilities.

An object of the invention is to provide novel illuminated annunciator display units which are reliable, readily installed, inexpensively manufactured and readily replaced and repaired.

While the invention is not limited to use in aircraft cockpits, ship bridges and control rooms, flight control towers, and other places in which instrumentation is operated in bright ambients, darkness or semi-darkness, the invention is especially useful in such applications and will be described in this relation. The lighting of instruments for such applications has posed a special problem because the instruments are often securely mounted in a way that requires substantial disassembly to provide access to the interior of the instrument to change a lamp and such that instrument operation is interrupted if access to its interior must be gained. Further, market for many of such instruments is limited, at least in the sense that each display arrangement may be the subject of only limited demand. This difficulty may be overcome by universality or versatility in design. It is an object of the invention to provide lighted display elements which solve the commercial problem and meet the technical requirements. It is an object of the invention to provide a lighted display system which provides the advantages of universality without sacrificing functional excellence, or the facility with which repairs and bulb replacement may be effected.

These and other objects and advantages of the invention are realized in part by the provision of a base incorporating electrical contacts and circuit runs, light modules containing a light source and having electrical surface contacts adapted to cooperate with the contacts and circuit runs of the base, the light modules being capable of emitting light from an opposite surface, a bezel capable of passing light from portions at least of said surface of the module, and a frame and means for securing the frame to the base, the frame being shaped to hold the bezel on the module and the module on the base when the frame and base are assembled together.

One embodiment of the invention is shown in the accompanying drawings, it being understood that various modifications may be made in the embodiment shown and that other embodiments of the invention are possible without departing from the spirit of the invention or the scope of the appended claims.

Figure 1:
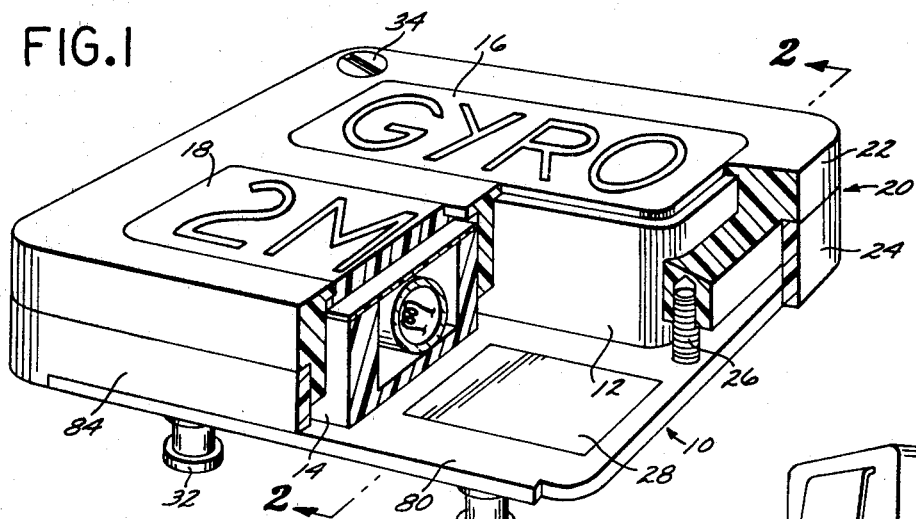
FIGURE 1 is an isometric view of an electrically lighted display unit embodying the invention, portions having been cut away to show the construction of the interior of the unit.

Referring to FIGURE 1 of the drawings, the light module there shown comprises a base generally designated 10, a pair of light modules 12 and 14 overlying the base, a bezel 16 overlying light module 12, another bezel 18 overlying light module 14, and a frame generally designated 20 and having an upper portion 22 and a lower portion 24. The lower portion 24 of the frame extends around the periphery of the unit encompassing the base on two opposite sides and overlying the base on its other two sides. The upper portion 22 of the frame overlies the lower portion 24 and is provided with conformations such that it telescopes within the lower frame and encompasses the light modules while overlying the margins of the bezels. The several elements are held together in assembled condition by machine screws which extend through the base 10 and are threadedly engaged in the upper portion 22 of the frame. One of these machine screws, designated by the numeral 26, is visible in FIGURE 1.

The light modules 12 and 14 are formed with electrical contacts on their lower surface. These contacts overlie and are electrically connected to electrical circuit contacts formed on the upper surface of the base 10. One of these surface contacts is visible in FIGURE 1 where it is designated by the numeral 28. The electrical circuit contacts of the base are connected to connector pins which extend below the base. Two pins are shown in FIGURE 1 and they are numbered 30 and 32 respectively. Two screws 34 extend from the front of the upper frame 22 through to the lower frame 24. The display unit may be fastened by these screws to a light plate, instrument panel or other apparatus with which the unit is to be associated.

The display unit selected for illustration in FIGURE 1 incorporates two light modules. Units having only one light module or more than two light modules may also be produced according to the invention. The light modules each comprise a unitary structure including redundant light sources housed in a container which is provided with electrical connections from the light source to the exterior on one side of the container and whose opposite side will emit light rays.

Means are provided for bringing external electrical connections to the light modules when the light modules are arranged in a predefined fashion. Advantageously, as shown, this means comprises a base having electrical circuit contacts on one face positioned to engage the external contacts of the modules when the modules occupy their selected relative positions.

Means are provided for utilizing light from the modules to display selected indicia. Advantageously, as shown, this means comprises bezels which overlie that face of the modules from which light is emitted.

In addition, means are provided in the invention for retaining the bezels and light modules in assembled condition in their selected relative positions while precluding the escape of light everywhere but from the bezels. Advantageously, as shown, this means comprises a frame which fits over and around the base and over and around the several bezel and light module assemblies. In the preferred form selected for illustration in the drawing, the frame comprises upper and lower telescopic sections, the upper one of which serves to protect, retain and fix the relative position of the bezel and light module assemblies, and the lower of which serves to relate the upper portion of the frame relative to the base. Together the two frame sections act to preclude light leakage in a way that eliminates need to maintain close dimensional tolerance in manufacture.

Figure 2:
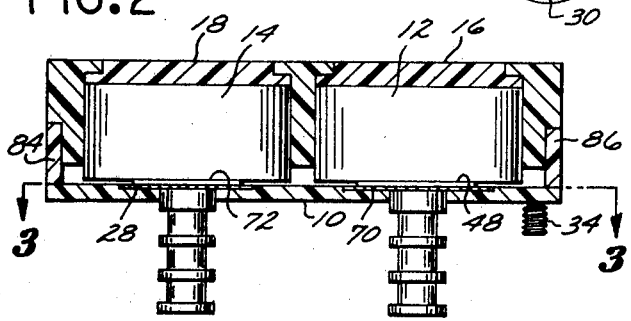
FIGURE 2 is a cross-sectional view taken on line 2—2 of FIGURE 1.
Figure 4:
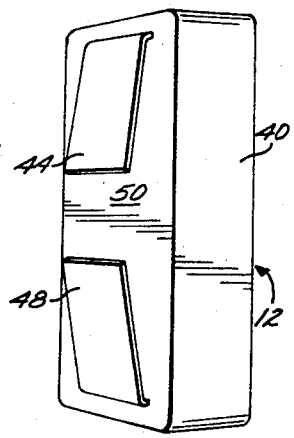
FIGURE 4 is an isometric view of a side and the rear of one of the light modules incorporated in the unit of FIGURE 1.
Figure 5:
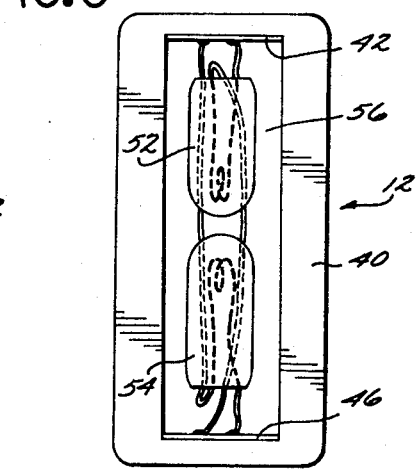
FIGURE 5 is a top plan view of the light module shown in FIGURE 4.

Referring to FIGURES 2, 4 and 5 the light modules 12 and 14 comprise a right rectangular receptacle or cubical casing formed of an opaque material which is electrically insulated. A metal material is preferred for heat dissipation capabilities to increase lamp service life. The module 12 is shown in FIGURES 4 and 5. As best shown in FIGURE 5, the casing 40 of the module has a recess formed in one of its faces. The inner, wider end 42 of one module terminal strip is disposed within this recess against one wall of the recess. The other end 44 of this same terminal strip extends through an opening in the opposite face of the casing 40 and is bent over the opposite face. Another terminal strip has its wide portion 46 disposed within the casing recess along an opposite interior face. The other end 48 of this terminal strip extends through an opening in the bottom wall of the casing 40 and is bent over the bottom of the case toward the portion 44 of the other terminal strip. The bent over portions 44 and 48 do not lie parallel with the rear surface of the module but extend at an angle from the plane of the surface. The terminal strips are formed from a resilient material which permits them to be pressed to a position parallel with the bottom 50 of the casing 40 while insuring that upon release of pressure they will spring back to the position shown away from the bottom wall 50. A pair of lamp bulbs 52 and 54 are disposed within the recess of the casing 40 and are wired in parallel to the portions 42 and 46 of the module connectors. These two lamps are illuminated when electrical energy is applied to terminal strip ends 44 and 48. In the preferred embodiment, each of the incandescent lamps 52 and 54 is capable of furnishing sufficient light for adequate functioning of the unit. Thus, one lamp is redundant of the other and is inclued to increase the probability that the unit will function properly. The connection wires of the lamps having been connected or bonded to the ends 42 and 46 of the terminal strips, the space within the cavity surrounding the lamp bulbs is filled with a translucent and preferably transparent potting compound. In the embodiment selected for illustration in the drawing the body 56 of potting compound is transparent. The cavity is potted flush to its top so that the upper face of the module is substantially flat and parallel with the rearward or lower face 50. The upper face may also be provided with colored materials to achieve different color coding capabilities as part of the annunciator package.

Figure 3:
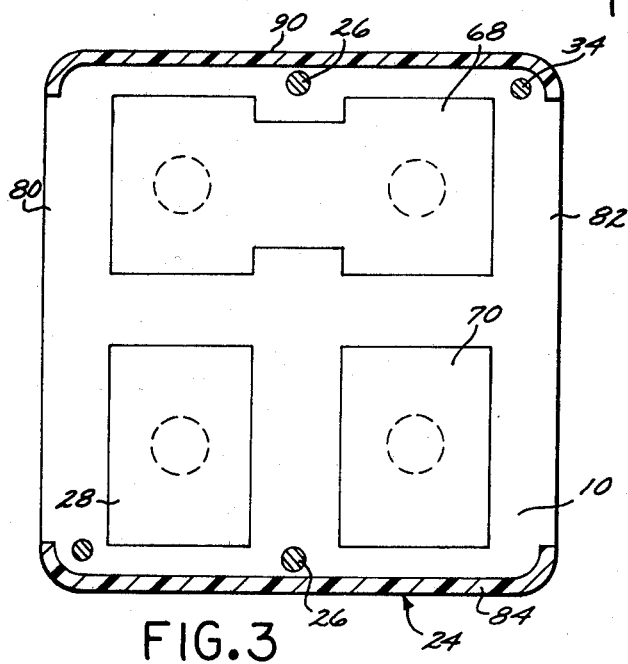
FIGURE 3 is a cross-sectional view taken on line 3—3 of FIGURE 2.

The base of the unit may be integrally formed with a light plate or the face of an instrument or console in which case it will comprise so much of the light plate or panel as underlies the modules and their frame. In the embodiment shown in the drawing, the base comprises a generally flat member sized to match and underlie the modules, however many are incorporated, and the frame that surrounds them. In FIGURE 2, the base 10 of the display unit shown comprises a generally flat sheet of insulating material whose upper face is recessed in selected areas to accommodate electrically conductive circuit runs which are adapted to engage the terminal strips on the lower or rear face of the modules. The circuit runs may be deposited or formed on the base, or embedded in the base, such that electrical connection is effected with each of the terminal strips of each of the modules employed. Certain of the circuit runs formed on the upper surface of the base 10 may be interconnected so that a single run is formed which engages one of the terminal strips of more than one light module. This arrangement is shown in FIGURE 3 of the drawing where one of the circuit runs 68 extends over the upper surface of the base 10 and has dimension to engage one of the terminal strips of each of the two modules 12 and 14. Two other circuit runs are formed, deposited, or embedded in the upper face of the base 10 in position to engage the other terminal strip of the two light modules respectively. One of these circuit runs, numbered 28, is visible in FIGURE 1 because a portion of light module 14 is broken away in that figure. The other circuit run of the unit is designated by the numeral 70. The circuit runs 28 and 70 are both visible in cross-section in FIGURE 2. Light module 12 overlies the base so that its terminal strip end 48 overlies and is in electrical connection with the circuit run 70 of the base. Light module 14 overlies the base so that one of its terminal strips 72 overlies the base circuit run 28.

In this embodiment, means are provided for making electrical connection to the circuit runs of the base from the rear or underside of the base. This means advantageously comprises a number of binding posts, one connected to each of the circuit runs of the base. The connector pins extend through openings in the base to a mechanical and electrical bond with the circuit run. Two terminals are employed in the case of circuit run 68. Other connector arrangements such as a multi-pin quick disconnect capability can be provided as an alternative to the stand off terminals.

A bezel is associated with each of the light modules. Bezel 16 overlies module 12 and bezel 18 overlies module 14. The bezels are formed of flat transparent material, advantageously a clear plastic, having length and width corresponding to that of the upper face of the light module. As best shown in FIGURE 2 the upper portion of the outer margin of the bezel is cut away. The result is that the lower, outer margin of the bezel forms a flange which, as best shown in FIGURE 1, extends entirely around the periphery of the bezel. The bezels are given an opaque coating over portions of their surface to define some area through which light may pass. The bezel is assembled in overlying relation to the module so that light emitted from the incandescent lamps, and passing through the transparent potting compound, passes through and is emitted from the bezel at selected points defining some indicia. In FIGURE 1 this indicia comprises the the word "GYRO," the letters of which are formed as omissions in the opaque coating applied to the upper surface of the bezel.

The opaque frame comprises a two part structure, the lower part of which is designated by the numeral 24. The relation between this lower portion of the frame and the base is best shown in FIGURE 1. The base is generally rectangular with rounded corners. It is provided with a lateral extension at two of its opposite sides. These extensions are designated 80 and 82 in FIGURE 3. The lower frame extends around the outer margin of the base 10. It comprises a vertical wall which overlies the base in the area of extensions 80 and 82. These overlying sides of the lower base are designated by the numerals 84 and 86 respectively. The other two side walls of the lower base 24 are numbered 88, 90 in FIGURE 3. They extend down to the lower face of the base and are disposed outside of but adjacent to the edges of the base and its other two sides. The upper edge of the lower frame 24 is flat in that all of it lies in the same plane.

The upper frame comprises a generally flat member whose upper and lower surfaces lie in a common plane. The upper frame is formed with cutouts to accommodate the light modules and their bezels and it is provided with conformations at the margins of those cutouts and at the margins of its lower surface such that it fits down upon the light modules and their bezels when the latter are placed in selected position upon the base and also such that the lower portion of the peripheral wall of the upper portion 22 of the frame telescopes within the lower portion of the frame and also such that the outer wall of the upper frame is flush with the outer wall of the lower frame around the periphery of the unit and also such that portions of the upper frame encompass the side walls of the light modules and of the bezels and also such that portions of the upper wall of the upper frame portion are disposed within the peripheral cutouts of the bezels and also such that the upper surface of the upper frame portion is substantially flush with the upper face of the bezel units when pressure sufficient to insure engagement between the terminal strips of the light modules and their respectively associated circuit runs of the base has been applied. To this end, the lower, outer margins of the upper frame section 22 are cut away to accommodate the side walls of the lower frame 24. Those portions of the upper frame which lie between adjacent light modules are T-shaped in cross-section so that the stem of the T lies between the light modules while the cross-bar portion of the T has its outer ends resting in the cutouts of adjacent bezels.

The unit is held in assembled condition by convenient means which connect the base to the upper portion of the frame. In the embodiment selected for illustration, this means comprises a pair of machine screws 26 which extend through openings in the lower base to threaded connection with the upper frame portion 22.

When both lamps of the light module become inoperative it is necessary only to remove the screws 34 and to remove the upper frame portion 22 of the unit. The light modules are then accessible and the defective one can be removed and replaced. When it is replaced the bezels are positioned over their respective modules and the frame portion 22 is then reassembled to the unit. If the display unit is oriented vertically or otherwise so that the modules cannot be placed upon the base independently of the upper frame, it is necessary only to assemble the bezels and light modules within the upper frame and then to place the frame in position over the lower frame and base and re-install the screws 26.

Although I have shown and described certain specific embodiments of my invention, I am fully aware that many modifications thereof are possible. My invention, therefore, is not to be restricted except insofar as is necessitated by the prior art and by the spirit of the appended claims.

I claim:
1. A lighted display unit comprising in combination:
   a base having electrical circuit contacts on one face thereof;
   a light module containing an electrically operable light source and having electrical circuit contacts in overlying engagement with the contacts of said base and capable of emitting light from a surface opposite said base upon energization of said source;
   a bezel capable of passing light from portions at least of said surface of the light module and overlying said surface of the module;
   and a frame and means for securing the frame to the base;
   the frame being shaped at one surface to lie upon said base, having portions encompassing the margins of said bezel and having conformations in its surface effective when said frame is secured to said base to maintain said bezel in position over said surface of said module and to maintain said module in overlying relation with said one surface of said base with its circuit contacts in electrical engagement with said base;
   and which further comprises additional light modules having similar shape to said light modules and a corresponding number of additional bezels having the shape of said bezel, said modules being disposed in side by side relation upon said base with contacts of said modules in electrical contact with those of said base, said bezels overlying respectively associated ones of said modules, and said frame including portions disposed between and separating said modules one from the other and disposed between and separating said bezels one from the other when said frame is assembled on said base.

2. The invention defined in claim 1, in which said frame comprises at least two portions one of which is entirely encompassed by the other and which nests telescopically within said other.

3. The invention defined in claim 2, in which both of said frame portions are removable from said base.

4. A lighted display unit comprising in combination:
   a base having a generally flat upper face and electrical contacts formed thereon;
   a light module in the form of a cubicle having paralleled upper and lower faces, containing a lamp and having resilient electrical contacts biased to extension from its lower face in overlying engagement with the contacts of the base and capable of emitting light from a surface opposite said face upon energization;
   a bezel having a flat lower face in overlying engagement with the upper face of said module; and
   frame means for holding the bezel in position against the light module and the module in position on the base against the bias of its contacts including a frame having upper and lower faces and formed with a cavity of size to complement the cubicle light module, the cavity opening at the lower face of the frame, said frame being formed with an opening of size to accommodate said bezel and extending from said cavity to the upper face of said frame.

5. The invention defined in claim 4, in which the upper face of the bezel is flush with the upper face of the frame.

6. The invention defined in claim 4, including additional light modules having similar shape to said light module and a corresponding number of additional bezels having the shape of said bezel, said modules being disposed in side by side relation upon said base with contacts of said modules in electrical contact with those of said base, said bezels overlying respectively associated ones of said modules, and said frame including portions disposed between and separating said modules one from the other and disposed between and separating said bezels one from the other when said frame is assembled on said base.

7. The invention defined in claim 4, in which said frame comprises a lower section having a lower margin overlying said base on two opposite sides and lying along side said base on two opposite sides.

8. The invention defined in claim 7, in which said frame further comprises an upper section having a lower portion telescoped within said lower section of said frame.

References Cited

UNITED STATES PATENTS

| | | | |
|---|---|---|---|
| 2,145,631 | 1/1939 | Pixley | 240—11.2 |
| 2,754,410 | 7/1956 | Thielorn | 240—8.2 X |
| 3,162,375 | 12/1964 | Huston | 240—2.1 X |
| 3,227,868 | 1/1966 | Morgan | 240—8.2 |
| 3,286,255 | 11/1966 | Sanchez | 240—2.1 X |
| 3,302,195 | 1/1967 | Fuller | 240—2.1 X |

NORTON ANSHER, Primary Examiner

R. W. ADAMS, Assistant Examiner